(12) United States Patent
Wang et al.

(10) Patent No.: US 10,601,795 B2
(45) Date of Patent: Mar. 24, 2020

(54) SERVICE PROCESSING METHOD AND ELECTRONIC DEVICE

(71) Applicant: TENCENT TECHNOLOGY (SHENZHEN) COMPANY LIMITED, Shenzhen (CN)

(72) Inventors: Qiang Wang, Shenzhen (CN); Zixi Shen, Shenzhen (CN); Wenqing Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 15/820,014

(22) Filed: Nov. 21, 2017

(65) Prior Publication Data

US 2018/0103017 A1 Apr. 12, 2018

Related U.S. Application Data

(63) Continuation of application No. PCT/CN2016/092434, filed on Jul. 29, 2016.

(30) Foreign Application Priority Data

Sep. 8, 2015 (CN) .......................... 2015 1 0567954

(51) Int. Cl.
*H04L 29/06* (2006.01)
*H04L 9/08* (2006.01)
(Continued)

(52) U.S. Cl.
CPC ........ *H04L 63/0442* (2013.01); *H04L 9/0825* (2013.01); *H04L 9/3247* (2013.01);
(Continued)

(58) Field of Classification Search
CPC . H04L 63/0442; H04L 9/0825; H04L 9/3247; H04L 9/3268; H04L 63/061;
(Continued)

(56) References Cited

U.S. PATENT DOCUMENTS 5,809,144 A * 9/1998 Sirbu ..................... G06Q 20/04
380/282
5,915,024 A * 6/1999 Kitaori .................. H04L 9/3247
380/30

(Continued)

FOREIGN PATENT DOCUMENTS

| CN | 101197674 A | 6/2008 |
| CN | 101471776 A | 7/2009 |

(Continued)

OTHER PUBLICATIONS

The World Intellectual Property Organization (WIPO). International Search Report for PCT/CN2016/092434 dated Oct. 31, 2016 5 Pages (including translation).

(Continued)

*Primary Examiner* — Shahriar Zarrineh
(74) *Attorney, Agent, or Firm* — Anova Law Group, PLLC (57) ABSTRACT

The present disclosure relates to the field of terminal technologies, and discloses a service processing method and an electronic device. In the present disclosure, a plaintext message used for performing a service operation is provided in a second electronic device. In this case, when needing to perform service processing, a first electronic device may obtain, by means of encryption transmission between the first electronic device and the second electronic device, the plaintext message provided by the first electronic device, so as to perform service processing based on the plaintext message. No key exchange is involved in the interaction, and a private key of an electronic device is not exported (Continued)

from the device. Therefore, in this process, a device application scenario is significantly extended while information security is ensured.

6 Claims, 6 Drawing Sheets

(51) Int. Cl.
*H04L 9/32* (2006.01)
*G06F 1/16* (2006.01)

(52) U.S. Cl.
CPC .......... *H04L 9/3268* (2013.01); *H04L 63/061* (2013.01); *H04L 63/0823* (2013.01); *H04L 63/123* (2013.01); *G06F 1/163* (2013.01); *H04L 2209/56* (2013.01); *H04L 2209/72* (2013.01)

(58) Field of Classification Search
CPC .............. H04L 63/0823; H04L 63/123; H04L 2209/56; H04L 2209/72; G06F 1/163
USPC ........................................................... 726/23
See application file for complete search history.

(56) References Cited

U.S. PATENT DOCUMENTS

| | | | | |
|---|---|---|---|---|
| 6,351,812 | B1* | 2/2002 | Datar | G06F 21/33 713/164 |
| 9,003,548 | B2* | 4/2015 | Pigin | G06F 21/6209 726/27 |
| 9,454,234 | B2* | 9/2016 | Zhang | G06F 3/0346 |
| 10,176,478 | B2* | 1/2019 | Griggs | G06Q 20/20 |
| 2002/0099663 | A1* | 7/2002 | Yoshino | G06F 21/10 705/65 |
| 2003/0078880 | A1* | 4/2003 | Alley | G06F 21/645 705/38 |
| 2005/0015586 | A1* | 1/2005 | Brickell | H04L 63/0428 713/156 |
| 2005/0132195 | A1 | 6/2005 | Dietl | |
| 2005/0268327 | A1* | 12/2005 | Starikov | H04L 63/0442 726/1 |
| 2006/0190736 | A1* | 8/2006 | John | H04L 63/102 713/182 |
| 2007/0011730 | A1* | 1/2007 | Hamano | H04L 9/0894 726/9 |
| 2007/0156836 | A1* | 7/2007 | Kelso | G06Q 10/107 709/207 |
| 2007/0219915 | A1* | 9/2007 | Hatano | H04L 9/0825 705/57 |
| 2008/0091936 | A1* | 4/2008 | Ikkanzaka | H04L 9/3247 713/150 |
| 2008/0091947 | A1* | 4/2008 | Dancer | H04L 63/0442 713/171 |
| 2010/0218169 | A1* | 8/2010 | Andersen | G06F 11/0793 717/125 |
| 2010/0290627 | A1* | 11/2010 | Tsuji | H04L 9/0825 380/282 |
| 2013/0139227 | A1* | 5/2013 | McIntyre | G06F 21/6218 726/4 |
| 2014/0171139 | A1* | 6/2014 | Liu | H04W 4/10 455/518 |
| 2014/0183258 | A1* | 7/2014 | DiMuro | G06Q 20/4012 235/380 |
| 2014/0351700 | A1* | 11/2014 | Feng | G06F 3/167 715/702 |
| 2015/0286813 | A1* | 10/2015 | Jakobsson | H04W 12/003 726/9 |
| 2016/0028549 | A1* | 1/2016 | Yuji | H04L 9/3247 713/176 |
| 2016/0080340 | A1* | 3/2016 | Oba | H04L 63/065 713/176 |
| 2016/0103495 | A1* | 4/2016 | Takatsuka | G06F 3/017 345/156 |
| 2016/0173169 | A1* | 6/2016 | Liu | G06F 21/32 455/41.1 |
| 2016/0253651 | A1* | 9/2016 | Park | G07F 9/023 705/39 |
| 2016/0274578 | A1* | 9/2016 | Arwine | H04L 63/0823 |
| 2016/0323266 | A1* | 11/2016 | Blocher | H04L 9/3268 |

FOREIGN PATENT DOCUMENTS

| | | |
|---|---|---|
| CN | 201315597 Y | 9/2009 |
| CN | 101631022 A | 1/2010 |
| CN | 102609841 A | 7/2012 |
| CN | 104320257 A | 1/2015 |
| CN | 105721413 A | 6/2016 |

OTHER PUBLICATIONS

The State Intellectual Property Office of the People's Republic of China (SIPO) Office Action 1 for 201510567954.5 dated Mar. 20, 2017 8 Pages (including translation).

\* cited by examiner

100
SERVICE PROCESSING METHOD AND ELECTRONIC DEVICE

CROSS-REFERENCES TO RELATED APPLICATIONS

This application is a continuation application of PCT Patent Application No. PCT/CN2016/092434, filed on Jul. 29, 2016, which claims priority to Chinese Patent Application No. 201510567954.5, entitled "SERVICE PROCESSING METHOD AND ELECTRONIC DEVICE" filed on Sep. 8, 2015, the entire contents of both of which are incorporated herein by reference.

FIELD OF THE TECHNOLOGY

The present disclosure relates to the field of terminal technologies, and in particular, to a service processing method and an electronic device.

BACKGROUND OF THE DISCLOSURE

With the development of terminal technologies, increasing functions can be implemented on a terminal. A user may perform various daily activities by using a terminal, and the most important activity is mobile payment involving financial services. Because services such as grabbing red envelops expand, as portable tools for payments and collections at any time, mobile phones and other terminals are widely accepted by the public.

During service processing such as mobile payment, to protect users' privacy and ensure property security, a process of verifying an identity of a user who currently performs an operation is involved. For example, the wearable device may exchange information with a payment terminal according to portability of a wearable device, to provide a unique identifier used for identifying a user, so as to verify that the user is currently performing a payment operation. Therefore, secure payment can be implemented without entering a password.

During implementation of the present disclosure, the inventor finds that the foregoing technology has at least the following problems:

In the foregoing service processing process, the wearable device can only provide an identity of a user to verify that the user is currently performing an operation, resulting in a single implemented function, fewer application scenarios, and poor applicability of the wearable device.

SUMMARY

To resolve the foregoing technical problems, embodiments of the present disclosure provide a service processing method and an electronic device. The technical solutions are as follows:

According to one aspect, an embodiment of the present disclosure provides a service processing method applied to a second electronic device. The method includes: receiving a service request of a first electronic device; encrypting a plaintext message corresponding to the service request by using a public key of the first electronic device, to obtain a first ciphertext message; obtaining a message digest of the plaintext message; encrypting the message digest by using a private key of the second electronic device, to obtain a digital signature of the second electronic device; adding the digital signature to the first ciphertext message, to obtain a second ciphertext message; and sending the second ciphertext message and a digital certificate of the second electronic device to the first electronic device, so that the first electronic device obtains the plaintext message of the second electronic device according to the second ciphertext message and the digital certificate, and performs service processing based on the plaintext message, the digital certificate being obtained by the second electronic device based on the plaintext message.

According to another aspect, an embodiment of the present disclosure provides a service processing method applied to a first electronic device. The method includes: sending a service request to a second electronic device; receiving a digital certificate and a second ciphertext message that are returned by the second electronic device, the second ciphertext message comprising a first ciphertext message and a digital signature; verifying the digital certificate of the second electronic device; when it is verified that the digital certificate of the second electronic device is valid, decrypting the first ciphertext message by using a private key of the first electronic device, to obtain a plaintext message; decrypting the digital signature by using a public key of the second electronic device, to obtain a message digest; verifying the plaintext message according to the message digest; and performing service processing based on the plaintext message when it is verified that the plaintext message is correct.

According to another aspect, an electronic device is provided. The electronic device includes: one or more processors; and a memory; the memory storing one or more programs, the one or more programs being configured to be executed by the one or more processors, and the one or more programs comprising instructions used for performing the following operations: receiving a service request of a first electronic device; encrypting a plaintext message corresponding to the service request by using a public key of the first electronic device, to obtain a first ciphertext message; obtaining a message digest of the plaintext message; encrypting the message digest by using a private key of the electronic device, to obtain a digital signature of the electronic device; adding the digital signature to the first ciphertext message, to obtain a second ciphertext message; and sending the second ciphertext message and a digital certificate of the electronic device to the first electronic device, so that the first electronic device obtains the plaintext message of the electronic device according to the second ciphertext message and the digital certificate, and performs service processing based on the plaintext message, the digital certificate being issued by a certificate issuing system.

According to another aspect, an electronic device is provided. The electronic device includes: one or more processors; and a memory; the memory storing one or more programs, the one or more programs being configured to be executed by the one or more processors, and the one or more programs comprising instructions used for performing the following operations: sending a service request to a second electronic device; receiving a digital certificate and a second ciphertext message that are returned by the second electronic device, the second ciphertext message comprising a first ciphertext message and a digital signature; verifying the digital certificate of the second electronic device; when it is verified that the digital certificate of the second electronic device is valid, decrypting the first ciphertext message by using a private key of the electronic device, to obtain a plaintext message; decrypting the digital signature by using a public key of the second electronic device, to obtain a message digest; verifying the plaintext message according to the message digest; and performing service processing based on the plaintext message when it is verified that the plaintext message is correct.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person skilled in the art may still derive other drawings from these accompanying drawings without creative efforts.

DESCRIPTION OF EMBODIMENTS

To make the objective, technical solutions, and advantages of the present disclosure clearer, the following further describes implementations of the present disclosure in detail with reference to the accompanying drawings.

The following describes a usage scenario of the embodiments of the present disclosure.

A PKI (public key infrastructure, Public Key Infrastructure) is a universally applicable security infrastructure that implements and provides security services based on an asymmetric key cryptography technology and for security purposes of data confidentiality and integrity, identity authentication, and non-repudiation. Content of the PKI includes a digital certificate, an asymmetric key cryptographic technique, an authentication center, certificate and key management, security agent software, a non-repudiation service, a timestamp service, a related information standard, technical specifications, and the like. The PKI is a universally applicable network security infrastructure. Some American scholars refer to infrastructures, including software, hardware, persons, and policies, providing full security services as PKI.

1. Technical features. The PKI provides security services including authentication, identity recognition, digital signatures, encryption, and the like for various applications by using an interface locally connecting to a user. On one hand, as an infrastructure, the PKI is separate from an application system using the PKI, thereby having a "public" characteristic. On the other hand, the PKI is of no use after being separated from the PKI application system. Such a characteristic of the infrastructure greatly improves efficiency of designing and developing a PKI system. This is because design, development, manufacturing, and management of the PKI system each can be performed independently and do not need to consider an application particularity.

2. Structural system. A digital certificate is the most basic element in the PKI. All security operations are mainly performed by using certificates. PKI components further include a certificate authority (CA) for signing the certificates, a registration authority (RA) for registering and approving signing of the certificates, and an electronic catalogue storing and publishing the certificates. In addition, the PKI further includes a certificate policy, a certificate path, a certificate subject, and the like. All of these are basic components of the PKI and are organically combined together to form the PKI. In network communications and network transactions, especially in e-commerce and e-government affairs, security assurance that is required most includes four aspects: identity recognition and authentication, confidentiality or privacy, data integrity, and non-repudiation.

3. Service system. Services provided by the PKI mainly include the following:

(1) In network communications and network transactions, especially in e-commerce and e-government affairs, security assurance that is required most includes four aspects: identity recognition and authentication, confidentiality or privacy, data integrity, and non-repudiation.

(2) PKI security includes many aspects such as device security, operation security, and protocol security. Algorithm security is mostly subjected to concern because it is the theoretical basis of the PKI security.

(3) The PKI depends on an asymmetric algorithm. In the asymmetric algorithm, if a public key (Public Key) is known, a private key (Private Key) can be obtained theoretically.

Figure 1:
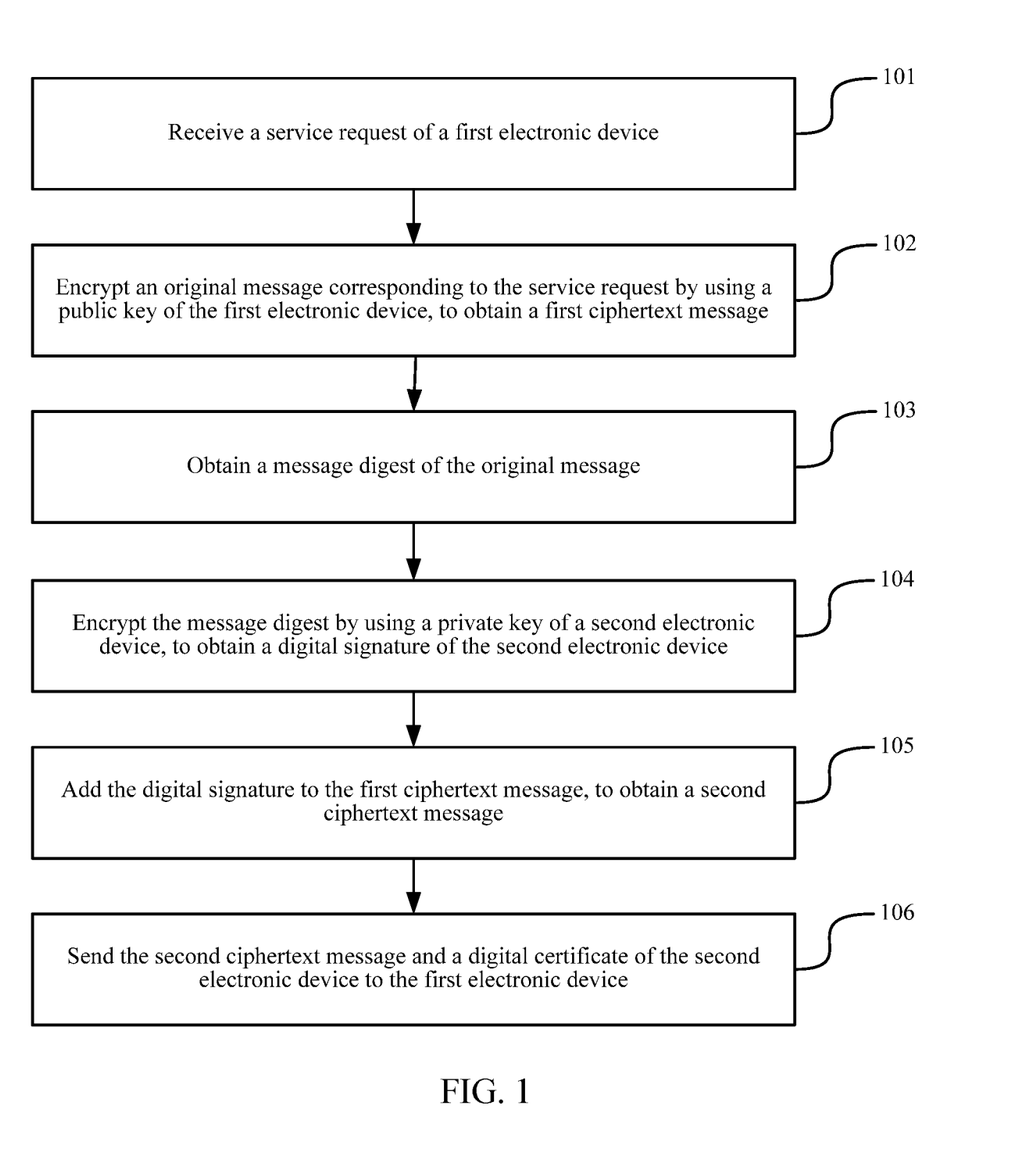
FIG. 1 is a flowchart of a service processing method according to an embodiment of the present disclosure.

FIG. 1 is a flowchart of a service processing method according to an embodiment of the present disclosure. The service processing method may be applied to a second electronic device, and the method includes the following steps:

101: Receive a service request of a first electronic device.

102: Encrypt a plaintext message corresponding to the service request by using a public key of the first electronic device, to obtain a first ciphertext message. A plaintext message, as used herein, may also be referred as an original message or plaintext information. Comparing to a ciphertext message, the plaintext message contains unencrypted information of the service request.

103: Obtain a message digest of the plaintext message.

104: Encrypt the message digest by using a private key of the second electronic device, to obtain a digital signature of the second electronic device.

105: Add the digital signature to the first ciphertext message, to obtain a second ciphertext message.

106: Send the second ciphertext message and a digital certificate of the second electronic device to the first electronic device, so that the first electronic device obtains the plaintext message of the second electronic device according to the second ciphertext message and the digital certificate, and performs service processing based on the plaintext message, the digital certificate being obtained by the second electronic device based on the plaintext message.

Optionally, before the encrypting a plaintext message corresponding to the service request by using a public key of the first electronic device, to obtain a first ciphertext message, the method further includes: receiving a signed email sent by the first electronic device, the signed email carrying the public key of the first electronic device, and obtaining the public key of the first electronic device from the signed email; or querying and obtaining the public key of the first electronic device from the certificate issuing system; or obtaining the public key of the first electronic device by using a key exchange protocol agreed with the first electronic device in advance.

Optionally, the plaintext message includes at least one piece of the following information: identification information; or financial information; or authentication information; or address information.

Optionally, the identification information comprises at least one of a social application account, a mobile number, email information, a network identity card, an identity card, a driving license, or a passport; or the financial information comprises at least one of a credit card, a debit card, or a network account; or the authentication information comprises at least one of a key, a unique identifier, a password, a time stamp, or a random number; or the address information comprises at least one of a house number, an address, or family information.

Optionally, the service request is an identity verification request, a financial-information access request, a payment request, or an information obtaining request.

Any combination of the foregoing optional technical solutions may be used to obtain an optional embodiment of the present disclosure. Details are not described herein.

Figure 2:
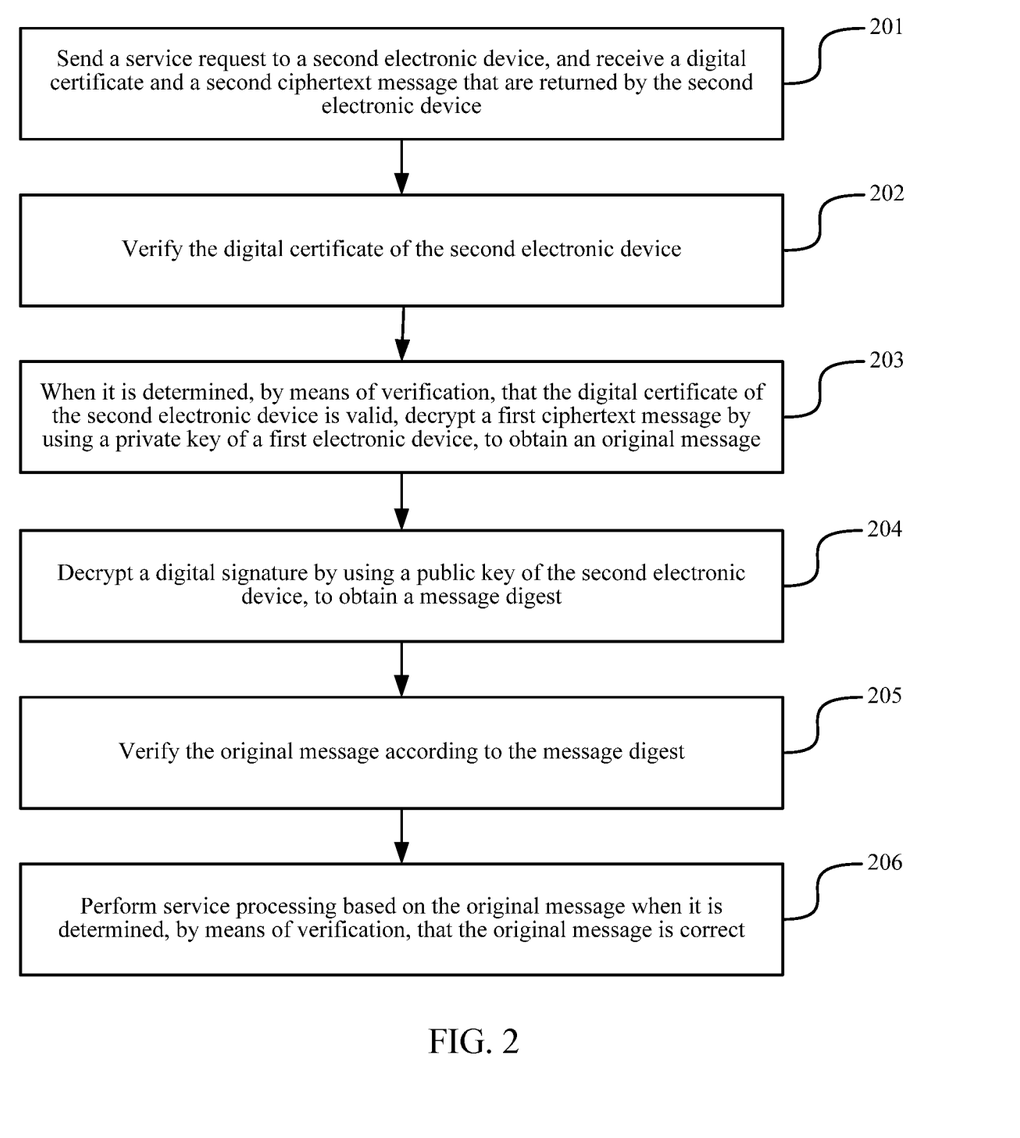
FIG. 2 is a flowchart of a service processing method according to an embodiment of the present disclosure.

FIG. 2 is a flowchart of a service processing method according to an embodiment of the present disclosure. The service processing method may be applied to a first electronic device, and the method includes the following steps:

201: Send a service request to a second electronic device, and receive a digital certificate and a second ciphertext message that are returned by the second electronic device, the second ciphertext message comprising a first ciphertext message and a digital signature.

202: Verify the digital certificate of the second electronic device.

203: When it is determined, by means of verification, that the digital certificate of the second electronic device is valid, decrypt the first ciphertext message by using a private key of the first electronic device, to obtain a plaintext message.

204: Decrypt the digital signature by using a public key of the second electronic device, to obtain a message digest.

205: Verify the plaintext message according to the message digest.

206: Perform service processing based on the plaintext message when it is determined, by means of verification, that the plaintext message is correct.

Optionally, the verifying the digital certificate of the second electronic device includes:

extracting a certificate issuing system signature in the digital certificate, decrypting the certificate issuing system signature in the digital certificate by using a public key of a certificate issuing system, to obtain a first message digest, performing a digest operation on the digital certificate to obtain a second message digest, and comparing the first message digest with the second message digest, if the two digests are consistent, the digital certificate being valid; and/or downloading a certification revoking list from a certificate issuing system, and if the digital certificate of the second electronic device is in the certification revoking list, determining that the digital certificate is invalid.

Optionally, before the decrypting the digital signature by using a public key of the second electronic device, to obtain a message digest, the method further includes: receiving a signed email sent by the second electronic device, the signed email carrying the public key of the second electronic device, and obtaining the public key of the second electronic device from the signed email; or querying and obtaining the public key of the second electronic device from a certificate issuing system; or obtaining the public key of the second electronic device by using a key exchange protocol agreed with the second electronic device in advance.

Optionally, the performing service processing based on the plaintext message when it is determined, by means of verification, that the plaintext message is correct comprises: displaying an operation option screen when it is determined, by means of verification, that the plaintext message is correct, the operation option screen being used for providing a service processing terminating option and a service processing continuing option; and performing service processing according to an option selected by a user on the operation option screen and the plaintext message.

Optionally, the performing service processing based on the plaintext message when it is determined, by means of verification, that the plaintext message is correct comprises: displaying an operation prompt screen when it is determined, by means of verification, that the plaintext message is correct, the operation prompt screen being used for prompting a user to continue to perform service processing by means of a shake operation; and performing service processing based on the plaintext message if a shake operation is detected.

Any combination of the foregoing optional technical solutions may be used to obtain an optional embodiment of the present disclosure. Details are not described herein.

Figure 3:
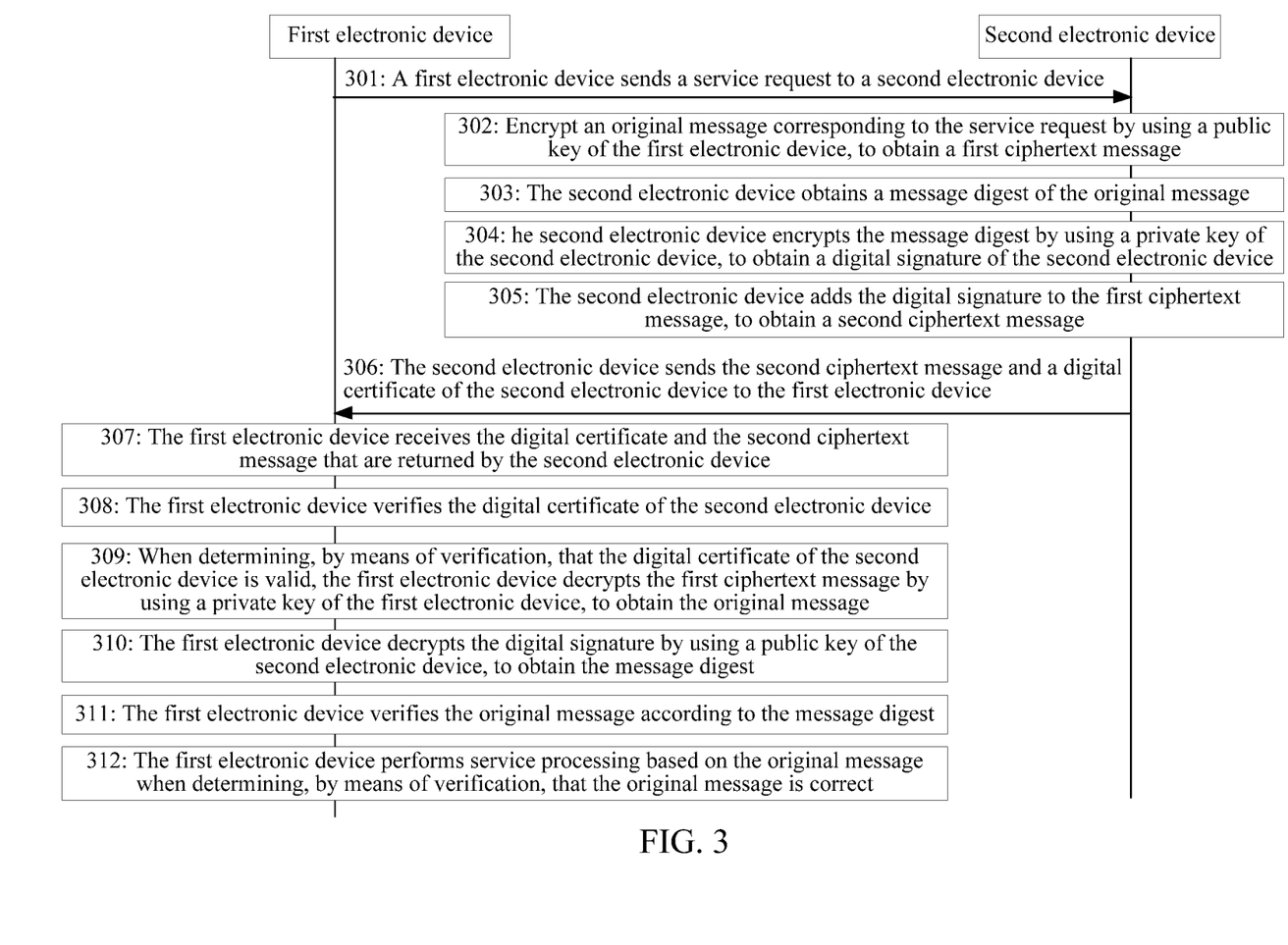
FIG. 3 is a flowchart of a service processing method according to an embodiment of the present disclosure.

FIG. 3 is a flowchart of a service processing method according to an embodiment of the present disclosure. Referring to FIG. 3, interactive parities in this embodiment may be a first electronic device and a second electronic device. The method specifically includes the following steps:

301: The first electronic device sends a service request to a second electronic device.

In this embodiment of the present disclosure, the first electronic device may be a wearable device or a mobile terminal, and the second electronic device may also be a wearable device or a mobile terminal. This embodiment of the present disclosure does not limit a specific type of an electronic device. That is, in the technical solution provided in this embodiment of the present disclosure, an electronic device serving as a service requesting party may be a wearable device or a mobile terminal, and an electronic device serving as a service requested party may also be a wearable device or a mobile terminal. The service requesting process may be performed between two mobile terminals or wearable devices that are of a same type, or may be performed between a mobile terminal and a wearable device. Because a device type of a requesting party and a device type of a requested party are not limited, a quantity of application scenarios for service processing is increased. The wearable device may be a device such as a Bluetooth headset or a smart band.

It should be noted that the service request is an identity verification request, a financial-information access request, a payment request, or an information obtaining request. (1) The identity verification request may be triggered in any usage scenario in which identity information of a user needs to be used, for example, account login or device identity verification. (2) The financial-information access request may be triggered in any usage scenario in which financial related information needs to be used, for example, be triggered in a usage scenario in which payment, mortgage offering, a property certificate, or opening a bank account is required. (3) The payment request may be triggered in any usage scenario such as online payment or offline payment. (4) The information obtaining request may be triggered in any information obtaining scenario, for example, a scenario in which a shipping address needs to be filled or an authentication scenario.

302: When receiving the service request of the first electronic device, the second electronic device encrypts a plaintext message corresponding to the service request by using a public key of the first electronic device, to obtain a first ciphertext message.

After receiving the service request of the first electronic device, the second electronic device may determine, according to a specific service type in the service request, the plaintext message corresponding to the service request. For the second electronic device, multiple types of plaintext messages may be stored, to expand an actual application scenario of the second electronic device. Optionally, the plaintext message includes at least one piece of the following information: (1) identification information, the identification information including at least one of a social application account, a mobile number, email information, a network identity card, an identity card, a driving license, or a passport; or (2) financial information, the financial information including at least one of a credit card, a debit card, or a network account; or (3) authentication information, the authentication information including at least one of a key, a unique identifier, a password, a time stamp, or a random number; or (4) address information, the address information including at least one of a house number, an address, or family information.

It should be noted that the first electronic device has a key pair, and the key pair includes the public key and a private key. The second electronic device may obtain the public key of the first electronic device before step 302, to perform encryption transmission with the first electronic device based on the public key. A process of obtaining the public key may include any one of the following manners:

Manner 1: A signed email sent by the first electronic device is received, the signed email carrying the public key of the first electronic device, and the public key of the first electronic device is obtained from the signed email.

Manner 2: The public key of the first electronic device is queried and obtained from a certificate issuing system.

Manner 3: The public key of the first electronic device is obtained by using a key exchange protocol agreed with the first electronic device in advance.

The public key of the first electronic device obtained by the second electronic device may be obtained and stored in the second electronic device in an initialization process of the second electronic device, so as to be directly used in a subsequent process, or may be obtained in real time after the service request of the first electronic device is received. This is not specifically limited in this embodiment of the present disclosure.

303: The second electronic device obtains a message digest of the plaintext message.

A process of obtaining the message digest includes: compressing the plaintext message by using a Hash digest algorithm such as an SHA (Secure Hash Algorithm, secure hash algorithm), an MD5 (Message Digest Algorithm, message digest algorithm 5), or an SM3 (hashing algorithm), to obtain the message digest of the plaintext message. A Hash digest algorithm that is specifically used may be set by a manufacturer, and is not limited in this embodiment of the present disclosure.

In addition, it should be noted that the plaintext message may be loaded in an additional field of a digital certificate, or may be separately stored in a specified secure region of the device. For example, the digital certificate may be an X.509 v3 certificate, and a data structure thereof is as follows:

Certificate
Version
Serial Number
Algorithm ID
Issuer
Validity
Not Before
Not After
Subject
Subject Public Key Info
Public Key Algorithm
Subject Public Key
Issuer Unique Identifier (Optional)
Subject Unique Identifier (Optional)
Extensions (Optional)
. . .
Certificate Signature Algorithm
Certificate Signature Correspondingly, based on the data structure, an extended field of the certificate may be used for loading the plaintext message.

304: The second electronic device encrypts the message digest by using a private key of the second electronic device, to obtain a digital signature of the second electronic device.

A private key of the first electronic device and the private key of the second electronic device each are stored in a secure cipher chip of the corresponding device respectively. Based on an asymmetric algorithm system, to ensure security, the private key can never be exported. And for the device, the private key of the device can only be used in an encryption process, and cannot be read by another device.

305: The second electronic device adds the digital signature to the first ciphertext message, to obtain a second ciphertext message.

A process of adding the digital signature to the first ciphertext message may be considered as a packaging process. This is not specifically limited in this embodiment of the present disclosure.

306: The second electronic device sends the second ciphertext message and a digital certificate of the second electronic device to the first electronic device.

In this case, multiple encryption has been performed on the second ciphertext message. Because the private keys of the first electronic device and the second electronic device cannot be exported, even though the second ciphertext message is captured by another device, the second ciphertext message cannot be decrypted, greatly improving security of information transmission.

When the second electronic device is to obtain the digital certificate, the second electronic device may provide basic device information for the certificate issuing system, so that the certificate issuing system issues the digital certificate to the second electronic device according to the basic device information. The digital certificate includes a certificate issuing system signature, and the certificate issuing system signature may be obtained by encrypting a message digest of the basic device information by using a private key of the certificate issuing system.

307: The first electronic device receives the digital certificate and the second ciphertext message that are returned by the second electronic device, the second ciphertext message comprising the first ciphertext message and the digital signature.

308: The first electronic device verifies the digital certificate of the second electronic device.

Specifically, the verifying the digital certificate of the second electronic device includes either of the foregoing manners:

Manner 1: The first electronic device may obtain a public key of the certificate issuing system from the certificate issuing system in advance, to certify whether the digital certificate of the second electronic device is the certificate issued by the certificate issuing system. A specific process includes: extracting a certificate issuing system signature in the digital certificate, decrypting the certificate issuing system signature in the digital certificate by using a public key of a certificate issuing system, to obtain a first message digest, performing a digest operation on the digital certificate to obtain a second message digest, and comparing the first message digest with the second message digest, if the two digests are consistent, the digital certificate being valid; or if the two digests are inconsistent, the digital certificate being invalid. Being invalid may refer to a case in which the certificate has expired or has been invoked.

Manner 2: A certification revoking list is downloaded from a certificate issuing system, and if the digital certificate of the second electronic device is in the certification revoking list, it is determined that the digital certificate is invalid.

Some certificate issuing systems may provide a certification revoking list to register a revoked digital certificate. In this case, the first electronic device may further download the certification revoking list to learn whether the digital certificate of the second electronic device that currently performs an operation corresponding to the service request is valid.

The verification of the validity of the digital certificate is mainly for verifying validity and authenticity of the second electronic device. After both the validity and the authenticity have been determined, the first electronic device may perform a subsequent service processing process.

309: When determining, by means of verification, that the digital certificate of the second electronic device is valid, the first electronic device decrypts the first ciphertext message by using a private key of the first electronic device, to obtain the plaintext message.

On the second electronic device side, the first ciphertext message is encrypted by using the public key of the first electronic device. Therefore, the first electronic device may use the private key of the first electronic device to decrypt the first ciphertext message. If decryption fails, it may be considered that an error occurs in transmission, and the error is reported. If decryption succeeds, the plaintext message provided by the second electronic device may be obtained.

310: The first electronic device decrypts the digital signature by using a public key of the second electronic device, to obtain the message digest.

It should be noted that the first electronic device may obtain the public key of the second electronic device in any one of the following manners: (1) receiving a signed email sent by the second electronic device, the signed email carrying the public key of the second electronic device, and obtaining the public key of the second electronic device from the signed email; (2) querying and obtaining the public key of the second electronic device from a certificate issuing system; or (3) obtaining the public key of the second electronic device by using a key exchange protocol agreed with the second electronic device in advance. A specific time for obtaining the public key of the second electronic device may be after the service request is sent, or may be in any stage of an initialization or operating process of the first electronic device. This is not limited in this embodiment of the present disclosure.

311: The first electronic device verifies the plaintext message according to the message digest.

In step 310 and step 311, integrity and accuracy of the plaintext message are verified. After validity and authenticity are verified, whether the plaintext message is complete or tampered with further needs to be verified, which can be performed by verifying the plaintext message. Because the digital signature is obtained according to the message digest, the message digest of the plaintext message provided by the second electronic device may be obtained by decrypting the digital signature, so as to verify, according to the message digest, the plaintext message obtained by the first electronic device through decryption. Specifically, the process may include: obtaining, by the first electronic device by using the Hash digest algorithm, the message digest of the plaintext message obtained through decryption, and comparing the obtained message digest with the message digest obtained through decryption by using the digital signature. If the two digests are consistent, verification of the plaintext message succeeds; if the two digests are inconsistent, verification of the plaintext message fails, subsequent processing is no longer performed, and an error may be reported to a user of the second electronic device.

312: The first electronic device performs service processing based on the plaintext message when determining, by means of verification, that the plaintext message is correct.

To improve security and controllability of service processing, a selection of whether to continue to perform service processing may be further provided for a user, so as to avoid a misoperation caused by some influence factors. Therefore, either of the following manners may be provided:

Manner 1: The performing service processing based on the plaintext message when it is determined, by means of verification, that the plaintext message is correct includes: displaying an operation option screen when it is determined, by means of verification, that the plaintext message is correct, the operation option screen being used for providing a service processing terminating option and a service processing continuing option; and performing service processing according to an option selected by a user on the operation option screen and the plaintext message.

In an actual scenario, to prevent data from being maliciously tampered with, an operation option screen needs to be provided for a user before actual service processing is performed. The operation option screen may further include specific information of current service processing, for example, specific information in a service request: a type of a current service, identity information of two parities of a service transaction, exchanged data (a transaction amount and the identity information) related to the service, and the like. Service processing is performed only when the user determines, by using an option, that next processing is allowed to be continuously performed, so as to ensure "what you see is what you sign", ensuring information security and property security. Specifically, if a determining operation performed by the user on the service processing terminating option is detected, service processing is terminated; if a determining operation performed by the user on the service processing continuing option is detected, service processing based on the plaintext message continues to be performed.

Manner 2: An operation prompt screen is displayed when it is determined, by means of verification, that the plaintext message is correct, the operation prompt screen being used for prompting a user to continue to perform service processing by means of a shake operation; and service processing is performed based on the plaintext message if a shake operation is detected.

A difference between Manner 1 and Manner 2 lies in that: no specific processing option is provided; instead, an operation that may be used for triggering further processing is prompted. For either the wearable device or the mobile terminal, a sensor configured to detect movements is usually provided. Therefore, a simple and easy operation such as a shake operation may be used for triggering next service processing. If no shake operation is detected within preset duration, it may be considered that the user does not expect to perform next processing, and the service processing may be terminated.

A plaintext message used for performing a service operation is provided in a second electronic device. In this case, when needing to perform service processing, a first electronic device may obtain, by means of encryption transmission between the first electronic device and the second electronic device, the plaintext message provided by the first electronic device, so as to perform service processing based on the plaintext message. No key exchange is involved in the interaction, and a private key of an electronic device is not exported from the device. Therefore, in this process, a device application scenario is significantly extended while information security is ensured. Further, in this embodiment of the present disclosure, a secure cipher chip authenticated by the State Password Administration Committee Office is used for storing a private key, ensuring security of the private key. In addition, multiple types of plaintext messages may be stored on one electronic device and applied to multiple usage applications, diversifying a usage application of the electronic device. Further, a screen display manner of determining whether to continue to perform service processing is provided, so as to avoid erroneous processing caused by a misoperation, erroneous triggering, or another case, and improve controllability of service processing by a user.

Figure 4:
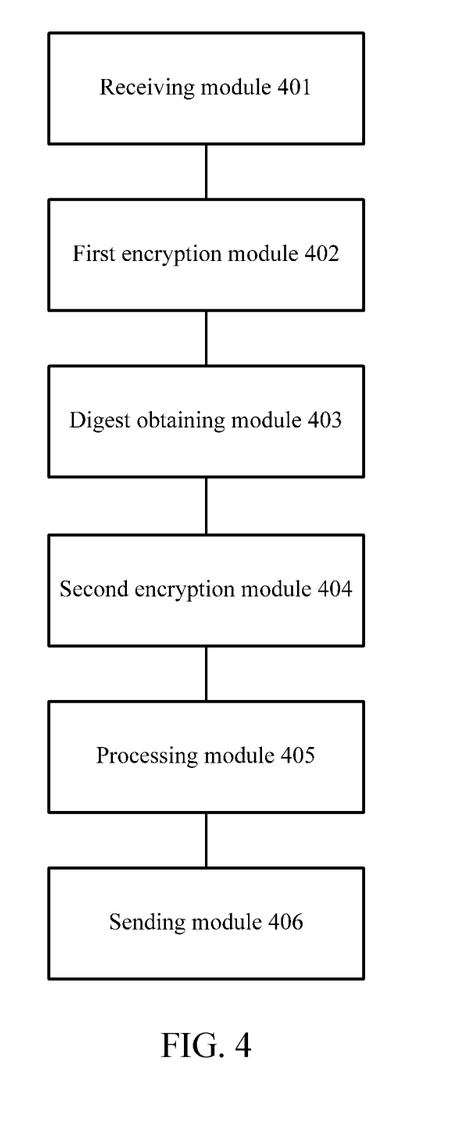
FIG. 4 is a schematic structural diagram of a service processing apparatus according to an embodiment of the present disclosure.

FIG. 4 is a schematic structural diagram of a service processing apparatus according to an embodiment of the present disclosure. Referring to FIG. 4, the apparatus includes:

a receiving module 401, configured to receive a service request of a first electronic device;

a first encryption module 402, configured to encrypt a plaintext message corresponding to the service request by using a public key of the first electronic device, to obtain a first ciphertext message;

a digest obtaining module 403, configured to obtain a message digest of the plaintext message;

a second encryption module 404, configured to encrypt the message digest by using a private key of the apparatus, to obtain a digital signature of the apparatus;

a processing module 405, configured to add the digital signature to the first ciphertext message, to obtain a second ciphertext message; and a sending module 406, configured to send the second ciphertext message and a digital certificate of the apparatus to the first electronic device, so that the first electronic device obtains the plaintext message according to the second ciphertext message and the digital certificate, and performs service processing based on the plaintext message, the digital certificate being obtained by the apparatus based on the plaintext message.

Optionally, the apparatus further includes a public key obtaining module. The public key obtaining module is configured to: receive a signed email sent by the first electronic device, the signed email carrying the public key of the first electronic device, and obtain the public key of the first electronic device from the signed email; or query and obtain the public key of the first electronic device from a certificate issuing system; or obtain the public key of the first electronic device by using a key exchange protocol agreed with the first electronic device in advance.

Optionally, the plaintext message includes at least one piece of the following information: identification information; or financial information; or authentication information; or address information.

Optionally, the identification information comprises at least one of a social application account, a mobile number, email information, a network identity card, an identity card, a driving license, or a passport; or the financial information comprises at least one of a credit card, a debit card, or a network account; or the authentication information comprises at least one of a key, a unique identifier, a password, a time stamp, or a random number; or the address information comprises at least one of a house number, an address, or family information.

Optionally, the service request is an identity verification request, a financial-information access request, a payment request, or an information obtaining request.

Any combination of the foregoing optional technical solutions may be used to obtain an optional embodiment of the present disclosure. Details are not described herein.

Figure 5:
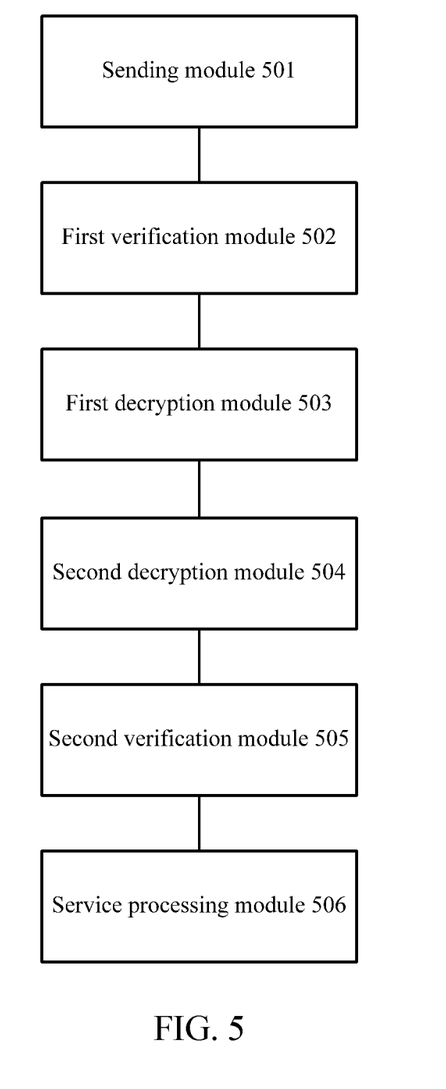
FIG. 5 is a schematic structural diagram of a service processing apparatus according to an embodiment of the present disclosure.

FIG. 5 is a schematic structural diagram of a service processing apparatus according to an embodiment of the present disclosure. Referring to FIG. 5, the apparatus includes:

a sending module 501, configured to send a service request to a second electronic device, and receive a digital certificate and a second ciphertext message that are returned by the second electronic device, the second ciphertext message comprising a first ciphertext message and a digital signature;

a first verification module 502, configured to verify the digital certificate of the second electronic device;

a first decryption module 503, configured to: when it is determined, by means of verification, that the digital certificate of the second electronic device is valid, decrypt the first ciphertext message by using a private key of the apparatus, to obtain a plaintext message;

a second decryption module 504, configured to decrypt the digital signature by using a public key of the second electronic device, to obtain a message digest;

a second verification module 505, configured to verify the plaintext message according to the message digest; and a service processing module 506, configured to perform service processing based on the plaintext message when it is determined, by means of verification, that the plaintext message is correct.

Optionally, the first verification module 502 is configured to:

extracting a certificate issuing system signature in the digital certificate, decrypting the certificate issuing system signature in the digital certificate by using a public key of a certificate issuing system, to obtain a first message digest, performing a digest operation on the digital certificate to obtain a second message digest, and comparing the first message digest with the second message digest, if the two digests are consistent, the digital certificate being valid; and/or downloading a certification revoking list from a certificate issuing system, and if the digital certificate of the second electronic device is in the certification revoking list, determining that the digital certificate is invalid.

Optionally, the apparatus further includes a public key obtaining module. The public key obtaining module is configured to:

receive a signed email sent by the second electronic device, the signed email carrying the public key of the second electronic device, and obtain the public key of the second electronic device from the signed email; or query and obtain the public key of the second electronic device from a certificate issuing system; or obtain the public key of the second electronic device by using a key exchange protocol agreed with the second electronic device in advance.

Optionally, the apparatus further includes:

a first display module, configured to display an operation option screen when it is determined, by means of verification, that the plaintext message is correct, the operation option screen being used for providing a service processing terminating option and a service processing continuing option.

The service processing module is configured to perform service processing according to an option selected by a user on the operation option screen and the plaintext message.

Optionally, the apparatus further includes:

a second display module, configured to display an operation prompt screen when it is determined, by means of verification, that the plaintext message is correct, the operation prompt screen being used for prompting a user to continue to perform service processing by means of a shake operation.

The service processing module is configured to perform service processing based on the plaintext message if a shake operation is detected.

Any combination of the foregoing optional technical solutions may be used to obtain an optional embodiment of the present disclosure. Details are not described herein.

It should be noted that when the service processing apparatus provided in this embodiment processes a service, division of the functional modules is only used as an example for description. In an actual application, the functions may be allocated to different functional modules according to specific needs, which means that the internal structure of the device is divided into different functional modules to complete all or some of the above described functions. In addition, the service processing apparatus provided in this embodiment and the embodiment of the service processing method belong to a same concept. For a specific implementation process of the service processing apparatus, refer to the method embodiment. Details are not described herein again.

An embodiment provides an electronic device. The electronic device may be configured to perform the service processing method provided in the foregoing embodiments.

Figure 6:
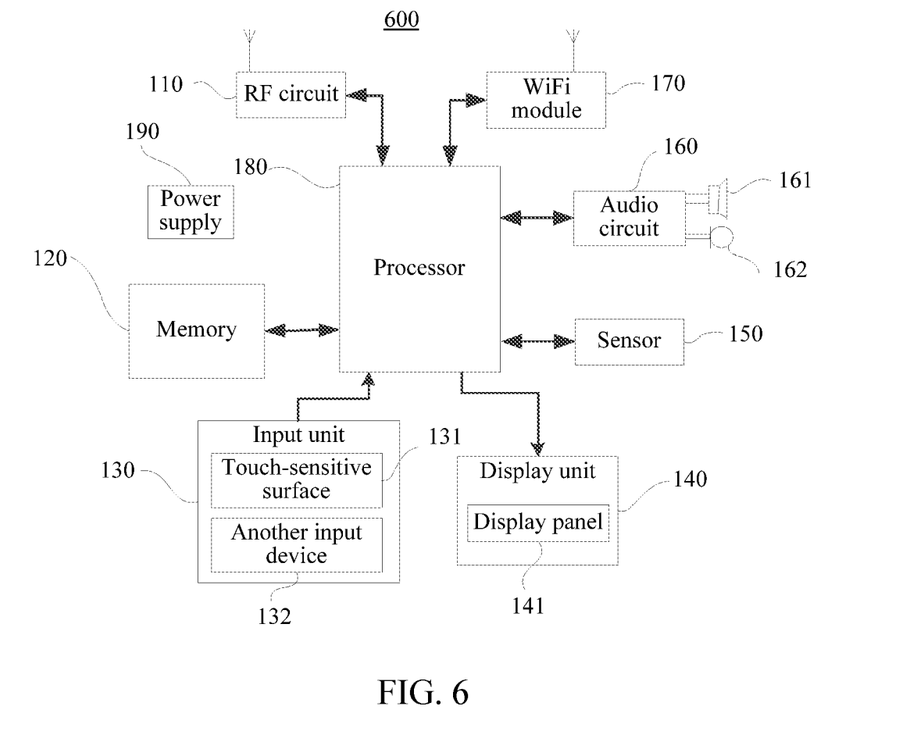
FIG. 6 is a schematic structural diagram of an electronic device according to an embodiment of the present disclosure.

Referring to FIG. 6, the electronic device 600 may include components such as an RF (Radio Frequency, radio frequency) circuit 110, a memory 120 including one or more computer readable storage media, an input unit 130, a display unit 140, a sensor 150, an audio circuit 160, a WiFi (Wireless Fidelity, wireless fidelity) module 170, a processor 180 including one or more processing cores, and a power supply 190. A person skilled in the art may understand that the structure of the electronic device shown in FIG. 6 does not constitute a limit to the electronic device. The electronic device may include more or fewer components than those shown in the figure, may combine some components, or may have different component arrangements.

The RF circuit 110 may be configured to perform information sending and receiving or receive and send a signal during a call. Especially, the RF circuit 110 sends, after receiving downlink information of a base station, the information to one or more processors 180 for processing, and sends involved uplink data to the base station. Generally, the RF circuit 110 includes but is not limited to an antenna, at least one amplifier, a tuner, one or more oscillators, a subscriber identity module (SIM) card, a transceiver, a coupler, an LNA (Low Noise Amplifier, low noise amplifier), a duplexer, and the like. In addition, the RF circuit 110 may further communicate with a network and another device by means of wireless communication. The wireless communication may use any communications standard or protocol, which includes, but is not limited to, GSM (Global System for Mobile Communications), GPRS (General Packet Radio Service), CDMA (Code Division Multiple Access), WCDMA (Wideband Code Division Multiple Access), LTE (Long Term Evolution), an e-mail, SMS (Short Message Service), and the like.

The memory 120 may be configured to store a software program and module. The processor 180 executes various function applications and performs data processing by running the software program and module stored in the memory 120. The memory 120 may mainly include a program storage area and a data storage area. The program storage area may store an operating system, an application program required by at least one function (such as a sound playing function and an image display function), and the like. The data storage area may store data (such as audio data and an address book) created according to use of the electronic device 600, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to receive entered numeric or character information and generate keyboard, mouse, joystick, optical, or trackball signal input related to user settings and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface 131 (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive and execute a command sent from the processor 180. In addition, the touch-sensitive surface 131 may be implemented in multiple types, such as a resistive type, a capacitive type, an infrared type, and a surface acoustic wave type. In addition to the touch-sensitive surface 131, the input unit 130 may further include the another input device 132. Specifically, the another input device 132 may include but is not limited to one or more of a physical keyboard, a function key (for example, a volume control key or a power on/off key), a trackball, a mouse, or a joystick.

The display unit 140 may be configured to display information entered by the user or information provided to the user, and graphical user interfaces of the electronic device 600. The graphical user interfaces each may include an image, text, an icon, a video, or any combination thereof. The display unit 140 may include a display panel 141. Optionally, the display panel 141 may be configured in a form of an LCD (Liquid Crystal Display, liquid crystal display), an OLED (Organic Light-Emitting Diode, organic light-emitting diode), or the like. Further, the touch-sensitive surface 131 may cover the display panel 141. After detecting a touch operation on or near the touch-sensitive surface 131, the touch-sensitive surface 131 transfer the touch operation to the processor 180 to determine a type of a touch event, and then the processor 180 provides corresponding visual output on the display panel 141 according to the type of the touch event. Although in FIG. 6, the touch-sensitive surface 131 and the display panel 141 are used as two separate components to implement input and output functions, in some embodiments, the touch-sensitive surface 131 and the display panel 141 may be integrated to implement the input and output functions.

The electronic device 600 may further include at least one sensor 150, for example, a light sensor, a motion sensor, and another sensor. Specifically, the light sensor may include an ambient light sensor and a proximity sensor. The ambient light sensor may adjust luminance of the display panel 141 according to brightness of ambient light, and the proximity sensor may turn off the display panel 141 and/or backlight when the electronic device 600 moves close to an ear. As a motion sensor, a gravity accelerometer sensor can detect acceleration magnitudes in all directions (generally three axes), can detect a magnitude and a direction of gravity when static, and can be applied to a mobile phone posture recognition application (for example, screen switching between landscape and portrait, related games, and magnetometer posture calibration), a function related to vibration recognition (for example, a pedometer or a tap gesture recognizer), and the like. Other sensors such as a gyroscope, a barometer, a hygrometer, a thermometer, and an infrared sensor that may also be configured in the electronic device 600 are not described herein.

The audio circuit 160, a speaker 161, and a microphone 162 can provide an audio interface between a user and the electronic device 600. The audio circuit 160 may transmit, to the speaker 161, an electrical signal that is obtained after received audio data is converted, and the speaker 161 converts the electrical signal into a sound signal for output. In another aspect, the microphone 162 converts a collected sound signal into an electrical signal, the audio circuit 160 receives the electrical signal, converts it into audio data, and then outputs the audio data to the processor 180 for processing, then the audio data is output to, for example, another electronic device by using the RF circuit 110, or the audio data is output to the memory 120 for further processing. The audio circuit 160 may further include a headset jack to provide communication between a peripheral headset and the electronic device 600.

WiFi belongs to a short-distance wireless transmission technology. The electronic device 600 may help, by using the WiFi module 170, the user send and receive an email, browse a web page, access streaming media, and the like. The WiFi module 170 provides wireless broadband Internet access for the user. Although FIG. 6 shows the WiFi module 170, it may be understood that the WiFi module 170 is not a necessary component of the electronic device 600, and when required, the WiFi module 170 may be omitted without changing the scope of the essence of the present disclosure.

The processor 180 is a control center of the electronic device 600, and is connected to various parts of the entire electronic device 600 (e.g., a mobile phone) by using various interfaces and lines. By running or executing the software program and/or module stored in the memory 120, and invoking data stored in the memory 120, the processor 180 performs various functions of the electronic device 600 and performs data processing, thereby overall monitoring the electronic device 600. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may not be integrated into the processor 180.

The electronic device 600 further includes the power supply 190 (for example, a battery) that supplies power to each component. Preferably, the power supply may be logically connected to the processor 180 by using a power supply management system, so that functions such as management of charging, discharging, and power consumption are implemented by using the power supply management system. The power supply 190 may further include any component such as one or more direct current power supplies or alternating current power supplies, a recharging system, a power supply fault detection circuit, a power converter or a power inverter, or a power status indicator.

Although not shown in the figure, the electronic device 600 may further include a camera, a Bluetooth module, and the like. Details are not described herein. Specifically, in this embodiment, the display unit of the electronic device is a touchscreen display. The electronic device further includes the memory and one or more programs. The one or more programs are stored in the memory, and are configured to be executed by one or more processors. The one or more programs include instructions used for performing operations performed by the foregoing first electronic device or second electronic device.

A plaintext message used for performing a service operation is provided in a second electronic device. In this case, when needing to perform service processing, a first electronic device may obtain, by means of encryption transmission between the first electronic device and the second electronic device, the plaintext message provided by the first electronic device, so as to perform service processing based on the plaintext message. No key exchange is involved in the interaction, and a private key of an electronic device is not exported from the device. Therefore, in this process, a device application scenario is significantly extended while information security is ensured.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A service processing method, comprising:

receiving, by a second electronic device, a service request of a first electronic device;

encrypting, by the second electronic device, a copy of a plaintext message corresponding to the service request by using a public key of the first electronic device, to obtain a ciphertext message, wherein the public key of the first electronic device is obtained via a signed email sent by the first electronic device;

generating, by the second electronic device and via a Hash digest algorithm, a message digest from another copy of the plaintext message;

encrypting, by the second electronic device, the message digest by using a private key of the second electronic device, to obtain a digital signature of the second electronic device;

sending, by the second electronic device, the ciphertext message and the digital signature to the first electronic device;

receiving, by the first electronic device, the ciphertext message and the digital signature from the second electronic device;

decrypting, by the first electronic device, the ciphertext message via a private key of the first electronic device, to obtain a received plaintext message;

digesting, by the first electronic device, the received plaintext message via the Hash digest algorithm to obtain a received-message-digest-version-one;

decrypting, by the first electronic device, the digital signature by using a public key of the second electronic device, to obtain a received-message-digest-version-two, wherein the pubic key of the second electronic device is obtained via a signed email sent by the second electronic device;

determining, by the first electronic device, that the received plaintext message is verified if the received-message-digest-version-one and the received-message-digest-version-two are consistent;

displaying, by the first electronic device, an operation screen to provide for a user an option to either terminate or continue with service-processing, the service-processing including processing of financial information, wherein the option is executable via a shake operation detected in a preset duration, and wherein the first electronic device is a wearable device to accommodate execution by the user of the option via the shake operation; and performing, by the first electronic device, service-processing based on the received plaintext message as verified and according to whether the user executes the option.

2. The method according to claim 1, further comprising at least one of:

obtaining the public key of the first electronic device from a public key issuing authority; and obtaining the public key of the first electronic device via a key exchange protocol agreed in advance with the first electronic device.

3. The method according to claim 1, wherein the plaintext message includes at least one of identification information, financial information, authentication information, and address information.

4. The method according to claim 3, wherein the identification information includes information on at least one of a social application account, a mobile number, email information, a network identity card, an identity card, a driving license, and a passport; the financial information includes information on at least one of a credit card, a debit card, and a network account; the authentication information includes information on at least one of a key, a unique identifier, a password, a time stamp, and a random number; and the address information includes information on at least one of a house number, an address, and family information.

5. The method according to claim 1, wherein the service request includes at least one of an identity verification request, a financial-information access request, a payment request, and an information obtaining request.

6. An electronic terminal comprising a memory and processor coupled to the memory, the processor being configured to perform:

receiving, by a second electronic device, a service request of a first electronic device;

encrypting, by the second electronic device, a copy of a plaintext message corresponding to the service request by using a public key of the first electronic device, to obtain a ciphertext message, wherein the public key of the first electronic device is obtained via a signed email sent by the first electronic device;

generating, by the second electronic device and via a Hash digest algorithm, a message digest from another copy of the plaintext message;

encrypting, by the second electronic device, the message digest by using a private key of the second electronic device, to obtain a digital signature of the second electronic device;

sending, by the second electronic device, the ciphertext message and the digital signature to the first electronic device;

receiving, by the first electronic device, the ciphertext message and the digital signature from the second electronic device;

decrypting, by the first electronic device, the ciphertext message via a private key of the first electronic device, to obtain a received plaintext message;

digesting, by the first electronic device, the received plaintext message via the Hash digest algorithm to obtain a received-message-digest-version-one;

decrypting, by the first electronic device, the digital signature by using a public key of the second electronic device, to obtain a received-message-digest-version-two, wherein the pubic key of the second electronic device is obtained via a signed email sent by the second electronic device;

determining, by the first electronic device, that the received plaintext message is verified if the received-message-digest-version-one and the received-message-digest-version-two are consistent;

displaying, by the first electronic device, an operation screen to provide for a user an option to either terminate or continue with service-processing, the service-processing including processing of financial information, wherein the option is executable via a shake operation detected in a preset duration, and wherein the first electronic device is a wearable device to accommodate execution by the user of the option via the shake operation; and performing, by the first electronic device, service-processing based on the received plaintext message as verified and according to whether the user executes the option.

* * * * *